United States Patent
Mehta et al.

(10) Patent No.: US 7,436,816 B2
(45) Date of Patent: Oct. 14, 2008

(54) METHOD AND SYSTEM FOR TRANSMISSION-BASED BILLING OF APPLICATIONS

(75) Inventors: Samir Narendra Mehta, Renton, WA (US); Mazin Ramadan, Seattle, WA (US); Ngochan Nguyen, Seattle, WA (US); Markus L. Jansen, Renton, WA (US)

(73) Assignee: Motorola, Inc., Schamburg, IL (US)

( * ) Notice: Subject to any disclaimer, the term of this patent is extended or adjusted under 35 U.S.C. 154(b) by 1039 days.

(21) Appl. No.: 10/085,981

(22) Filed: Feb. 26, 2002

(65) Prior Publication Data

US 2002/0128984 A1 Sep. 12, 2002

Related U.S. Application Data

(60) Provisional application No. 60/271,661, filed on Feb. 26, 2001.

(51) Int. Cl.
*H04L 12/66* (2006.01)
*H04L 12/16* (2006.01)
*H04L 1/00* (2006.01)
*H04L 9/00* (2006.01)
*H04L 9/28* (2006.01)
*H04K 1/00* (2006.01)

(52) U.S. Cl. .......................... 370/352; 370/259; 380/28

(58) Field of Classification Search ................ 370/252, 370/401, 331, 351, 352, 254, 338, 349, 410, 370/389, 335, 395, 466, 328, 310, 259; 705/71, 705/26, 14, 34, 6, 53, 76, 39, 40, 412; 709/206, 709/295, 203, 224, 218; 379/93.25, 90.01, 379/94, 95, 114.03, 88.2, 201.11, 106; 707/2; 708/134; 455/405, 456.1, 406, 414.1, 41.2; 700/286; 725/104; 340/928, 933, 870; 701/117, 701/118; 380/28
See application file for complete search history.

(56) References Cited

U.S. PATENT DOCUMENTS 4,640,986 A 2/1987 Yotsutani et al.

(Continued)

FOREIGN PATENT DOCUMENTS

EP 0 715 247 A1 6/1996

(Continued)

*Primary Examiner*—Wing F. Chan
*Assistant Examiner*—Prenell P Jones
(74) *Attorney, Agent, or Firm*—Philip H. Burrus, IV

(57) ABSTRACT

Computer- and network-based methods and systems for transmission-based billing are provided. Example embodiments provide a Packet-Based Billing System ("PBBS"), which enables application providers, such as carriers and content providers, to bill subscribers for the use of content on mobile subscriber devices, such as wireless devices, on a per-application, per-user basis based upon the extent of the usage. Embodiments of the present invention can also be used to bill subscribers for the use of content on a per-application, per-user basis for wired subscriber devices as well, using the same techniques. In operation, the PBBS provides modified content by inserting billing and tracking code into content returned to a requesting device. The modified content, when executed, tracks the amount of data sent and received between the content and a network and posts the accumulated data to a proxy/billing server according to business rules for an interval/frequency to post such data. The proxy/billing server stores the raw billing data and an accounting program retrieves the billing data to generate customer (call) data records. Business rules that specific different charges for different content or users can be incorporated into the system.

6 Claims, 13 Drawing Sheets

U.S. PATENT DOCUMENTS

| | | | | |
|---|---|---|---|---|
| 4,961,158 | A * | 10/1990 | Sussman | 708/134 |
| 5,103,475 | A | 4/1992 | Shuen | |
| 5,634,010 | A | 5/1997 | Ciscon et al. | |
| 6,073,124 | A | 6/2000 | Krishnan et al. | 705/59 |
| 6,097,792 | A * | 8/2000 | Thornton | 379/88.2 |
| 6,104,704 | A * | 8/2000 | Buhler et al. | 370/252 |
| 6,138,156 | A * | 10/2000 | Fletcher et al. | 709/224 |
| 6,141,652 | A | 10/2000 | Reeder | 705/53 |
| 6,333,975 | B1 * | 12/2001 | Brunn et al. | 379/106.03 |
| 6,338,046 | B1 * | 1/2002 | Saari et al. | 705/34 |
| 6,377,982 | B1 | 4/2002 | Rai et al. | |
| 6,473,749 | B1 * | 10/2002 | Smith et al. | 707/2 |
| 6,603,761 | B1 * | 8/2003 | Wang et al. | 370/352 |
| 2001/0019605 | A1* | 9/2001 | Rojas | 379/114.03 |
| 2001/0056389 | A1* | 12/2001 | Fair et al. | 705/34 |
| 2002/0022471 | A1* | 2/2002 | Watler et al. | 455/405 |
| 2002/0023210 | A1 | 2/2002 | Tuomenoksa et al. | |
| 2002/0029287 | A1 | 3/2002 | Yechiam | |
| 2002/0069263 | A1* | 6/2002 | Sears et al. | 709/218 |
| 2002/0133457 | A1* | 9/2002 | Gerlach et al. | 705/39 |
| 2002/0138622 | A1 | 9/2002 | Dorenbosch et al. | |
| 2003/0009385 | A1* | 1/2003 | Tucciarone et al. | 705/26 |
| 2003/0157926 | A1* | 8/2003 | Ala-Laurila et al. | 455/406 |
| 2003/0220926 | A1 | 11/2003 | Huelsman et al. | |
| 2004/0005878 | A1* | 1/2004 | Olin et al. | 455/414.1 |
| 2004/0125755 | A1* | 7/2004 | Roberts | 370/259 |
| 2004/0193329 | A1* | 9/2004 | Ransom et al. | 700/286 |
| 2005/0102422 | A1 | 5/2005 | Yamamoto | |
| 2007/0050267 | A1* | 3/2007 | Toshikage et al. | 705/26 |
| 2007/0189514 | A1* | 8/2007 | Mehta et al. | 380/28 |

FOREIGN PATENT DOCUMENTS

| | | |
|---|---|---|
| EP | 1 026 853 A1 | 8/2000 |
| EP | 1065838 | 1/2001 |
| EP | 1065838 A2 | 1/2001 |
| JP | 09-101986 | 4/1997 |
| JP | 09-282275 | 10/1997 |
| JP | 9-288575 | 11/1997 |
| JP | 9-319575 | 12/1997 |
| JP | 2000-357191 | 12/2000 |
| JP | 2000-358282 | 12/2000 |
| WO | WO 95/22230 | 8/1995 |
| WO | WO 97/26739 | 7/1997 |
| WO | WO 97/26739 A1 | 7/1997 |
| WO | WO 99/31610 | 6/1999 |

* cited by examiner

METHOD AND SYSTEM FOR TRANSMISSION-BASED BILLING OF APPLICATIONS

BACKGROUND OF THE INVENTION

1. Field of the Invention

The present invention relates to a method and system for transmission-based billing and, in particular, to methods and systems for billing the use of wireless and wired applications based upon data transmitted over a network.

2. Background Information

Today, wireless devices have become prolific in many communities of the world. Devices such as wireless phones, handsets, personal information managers, electronic organizers, personal digital assistants, portable e-mail machines, game machines, and other devices are used by subscribers of telephone carriers to add convenience to our lives. However, the software used on such devices and the mechanisms for deploying and billing for the use such software to these devices are arcane. Typically, applications or other services are billing when they are loaded onto a wireless device (a one-time, flat fee charge); on a subscription basis, such as a charge for the overall use of a set of applications and services; or for total airtime. In newer, third generation, wireless networks, such as GPRs, carriers are able to identify a total number of physical packets or the amount of data used by a device. Thus, billing models for a typical network carrier reflect flat fee or subscription-based billing and do not necessarily accurately reflect use of applications and services. For example, wireless applications that access a network while running on the device, for example a calendar, a browser, or an email client, typically utilize different carrier resources than applications that do not access a network, for example, a calculator or a text editor. A carrier or content provider is unable to accurately charge for the amount of carrier resources a particular application consumes because current billing systems provided at the wireless carrier level are unable to provide differentiated billing on an application level, except at the time of download.

BRIEF SUMMARY OF THE INVENTION

Embodiments of the present invention provide computer- and network-based methods and systems for transmission-based billing, which provides the tracking of billing information based upon the volume of data transmitted between applications, or other types of content, and a network. Example embodiments provide a Packet-Based Billing System ("PBBS"), which enables application providers, such as carriers and third party content providers, to bill clients or subscribers (generically "users") for the use of applications/services (generically, "content") on mobile subscriber devices, such as wireless devices, on a per-application, per-user basis based upon the extent of the usage. Embodiments of the present invention can also be used to bill subscribers on a per-application, per-user basis for wired subscriber devices as well, using the same techniques.

The PBBS determines and provides billing and tracking code and associated communication support, generally referred to collectively herein as "billing tracking code," to enable application and service providers or other content providers (typically carriers) to automatically track billing information on a configurable, logical packet level, based upon the amount of data sent and/or received by the application or service over the network. In the case of wireless devices and a wireless network, this billing data tracks usage of the network on a per-application basis instead of traditional "total airtime" use models. The data tracked is associated with a particular user, thus allowing the application or service provider to bill on a per-user, per-application basis based upon actual volume of use. In one embodiment, the billing data tracked and posted includes an amount of data sent/received across the network, a timestamp, an application identifier, a security key, a transaction identifier, and a retry expiration indicator. In other embodiments, the billing data may include a subset of these data or may include different or additional data. The application/service provider can subsequently implement a variety of billing policies at the application or user level, which can change over time.

In one embodiment, the PBBS instruments packet-based billing tracking code into the content to track and accumulate billing data on the client device and to post the data to a server, such as a proxy server or a billing server. For some content, such as Java applications, .NET applications, and other binary applications, instrumentation is accomplished at the byte-code level. In one such embodiment, the instrumentation is performed by a content (code) modifier that analyzes the content to determine data structures, calling sequence, and location and identity of any network calls and replaces these calls by proxy network calls that contain the billing tracking code.

In another embodiment, the billing tracking code is incorporated into the content by modifying the content according to a written specification. In yet another embodiment, the billing tracking code is incorporated into the content through calls to an Application Programming Interface library. In yet another embodiment, the billing tracking code is placed in the network driver software on the client device and interfaces directly to a proxy/billing server.

In yet another embodiment, a security key is inserted into the content to enable the billing tracking code to identify itself to a proxy server when billing data is posted from a client device. In one such embodiment, the security key is a number uniquely associated with each content/user combination and is stored in a secure data repository to prevent misappropriation and false billing data. In another embodiment, the security key is a unique random number.

In one embodiment, the PBBS comprises a content (code) modifier; one or more data repositories containing associations of network calls to different proxy network calls containing billing tracking code, business rules for billing data, raw billing data, and security keys; a proxy server, a billing server, and an accounting program. In accordance with this embodiment, the PBBS functions may be integrated into and dispersed over different components in an application provisioning system. These components then interact to determine and insert billing tracking code into the content; receive data from the billing tracking code; and process the tracked data in conjunction with indicated billing policies to generate billing records. In one embodiment, the billing tracking code is inserted in response to a request from a client device for an application and a modified application is automatically returned. The billing data is then posted when the modified application is executed on the client device. In another embodiment, the billing data is generated directly in response to a request from a client device for streaming content, such as streaming audio and video, since the requests are for a particular number of bytes or amount of data. In one of these embodiments, the application provisioning system provisions applications for wireless devices. In another embodiment, the application provisioning system provisions applications for wired devices.

In another embodiment, the transmission-based data is used to route network packets from applications to other servers (network traffic). According to this embodiment, the transmission-based (billing) data is used to determine the extent of resources an application is consuming so that a proxy server can direct network traffic to promote greater efficiency or, for example, to provide/guarantee better response time for heavily used or popular applications, or applications based upon some other criteria.

DETAILED DESCRIPTION OF THE INVENTION

Embodiments of the present invention provide computer- and network-based methods and systems for transmission-based billing, which provides the tracking of billing information based upon the volume of data transmitted between applications, or other types of content, and a network. Example embodiments provide a Packet-Based Billing System ("PBBS"), which enables application providers, such as carriers and third party content providers, to bill clients or subscribers (generically "users") for the use of applications/services (generically "content") on mobile subscriber devices, such as wireless devices, on a per-application, per-user basis based upon the extent of the usage. Embodiments of the present invention can also be used to bill subscribers on a per-application, per-user basis for wired subscriber devices as well, using the same techniques. Although this description primarily refers to applications, one skilled in the art will recognize that the methods and systems described herein are applicable to any other type of content that can be transmitted at a packet level across a network, such as services and resources, and that is capable of communicating billing data to a server when it is "executed" on a client device. For example, an engine for playing audio, or video, etc. can be modified for transmission-based billing according to these methods. In addition, the methods and systems described herein are extendable to content that can be streamed, such as text, video, audio, graphics, etc.

The PBBS dynamically provides billing tracking code and associated communication support, referred to collectively herein as "billing tracking code," to enable application, and service providers or other content providers (typically carriers) to automatically track billing information on a configurable, logical packet level, based upon the amount of data sent and/or received by the application or service. The data tracked is associated with a particular user, thus allowing the content provider to bill on a per-user, per-application basis based upon actual volume of use. The content provider (used herein to refer generally to any type of content provider) can subsequently implement a variety of billing policies at the application or user level, which can change over time. For example, an application provider may desire to charge lower fees for popular applications when they are heavily used by a subscriber, for example, as measured by the quantity of packet data received/sent by those applications for the particular subscriber. As another example, a service provider may desire to implement a promotion for a new application, charging less per transmission volume for that particular application in comparison to a normal fee.

Figure 1:
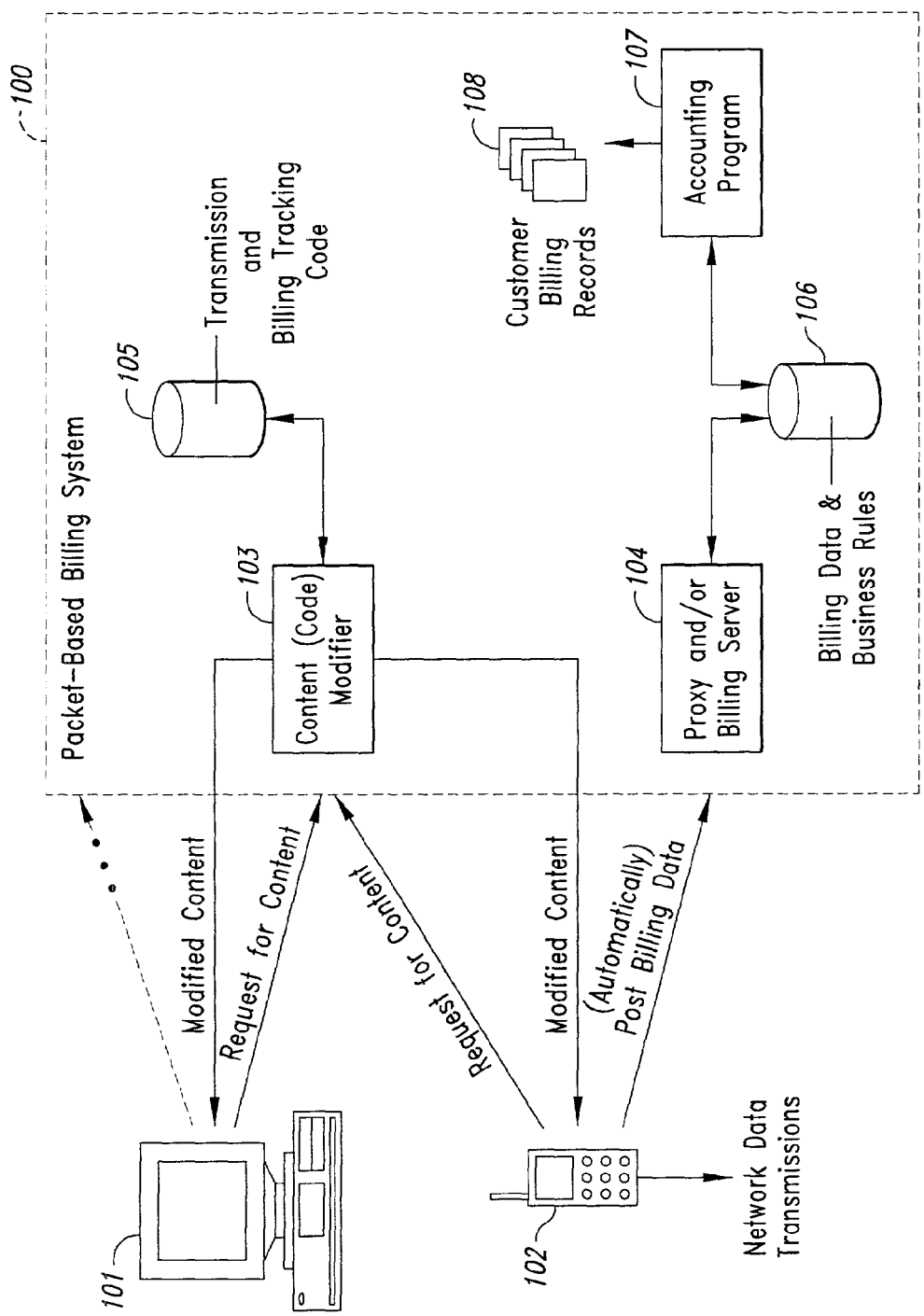
FIG. 1 is an overview block diagram of an example transmission-based billing system.

FIG. 1 is an overview block diagram of an example transmission-based billing system. In FIG. 1, the Packet-Based Billing System 100 comprises several components: a content (code) modifier 103 for modifying requested content to contain billing tracking code; a configuration data repository 105 for storing the transmission and billing tracking code; a proxy server and/or billing server 104 for receiving and collecting billing data from content that is downloaded to target (client) devices; a billing data repository 106 for storing the collected billing data and business rules for collecting billing information; and an accounting program 107 for reading the collected billing data and generating customer billing records 108. As will be described in further detail below, the PBBS components are typically integrated into a system that provides content to target devices. In operation, a client device, such as personal computer 101 or wireless handset 102, requests content, such as an application, from a system that provides the content. The content may be requested from a system that is connected via a wireless network to a wireless device, such as handset 102, or from a system that is connected via a wired network to a wired device, such as personal computer 101. As part of the process of requesting content, after the system determines and retrieves the requested content, the content modifier 103 analyzes the content and consults the configuration data repository 105 to determine what type billing tracking code needs to be inserted into the requested content and transparently modifies the content accordingly. The modified content is then returned to the client device 101/102 for downloading. At subsequent times, when the downloaded modified content is executed on the client device 101/102, the billing tracking code is automatically executed to collect and post billing data to the proxy/billing server 104. The billing server 104 collects and stores the received billing data according to the business rules in billing data repository 106. The accounting program 107 can then retrieve the collected billing data to generate the customer billing records 108. Typically, the accounting program is specifically designed to accommodate the needs of a service responsible for the billing, such as a carrier in a wireless networking environment.

Example billing data includes the number of bytes sent and/or received, a time stamp, an application identifier, user identifier (sent automatically by the carrier infrastructure when billing data is sent over a wireless network), a security key, a transaction identifier, and a retry expiration indicator. The transaction identifier is typically used to identify individual/different billing tracking "events." The retry expiration indicator indicates how long a client device should continue to re-post the same billing data, when the client device realizes a post operation has failed. Similarly, a proxy/billing server uses the retry expiration indicator to determine how long a transaction identifier is valid, in order to detect duplicate received postings.

In one embodiment, the PBBS content modifier (e.g., content (code) modifier 103 of FIG. 1) instruments packet-based billing tracking code into the requested content to accomplish the techniques of the present invention. Instrumentation, as used herein, is a non-intrusive means for modifying content (e.g., an application) to include additional code, which in this case is billing tracking and transmission code. In one embodiment, network calls resident in the content are detected by the PBBS code modifier and replaced by transmission-based billing specific billing tracking code, which computes and collects the packet-based billing data and invokes the originally specified network calls. Instrumentation in this sense is used as a "hook" before or after a network call as a method for intercepting the network call. Because different content in different environments will use a variety of network calls and because different providers having different billing policies, the PBBS code modifier uses a configuration data repository (such as configuration data repository 105 in FIG. 1) to determine which replacement network call to instrument into the content. The replacement calls may store the collected billing data locally in temporary storage on the target device and then post the collected data when the content finishes execution (for example, when an application exits). Alternatively, the collected data may be posted upon each network call. In addition, the collected data may be stored in permanent storage on the client device so that it may be posted after cycling power on the device. One skilled in the art will recognize that different scenarios for when data is posted are possible and contemplated to work with these techniques.

Figure 2:
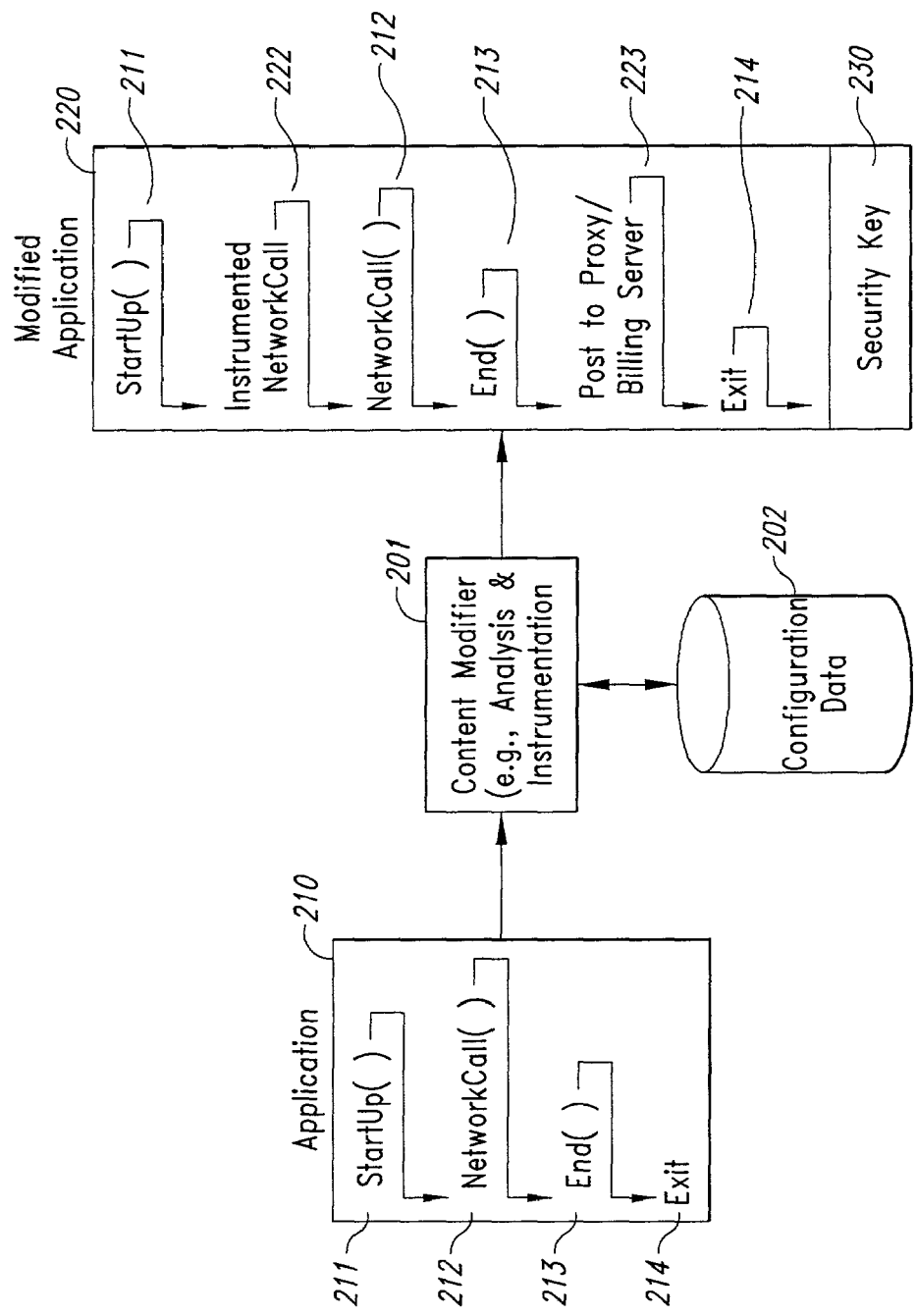
FIG. 2 is an example block diagram of content instrumented with billing tracking code as performed by a content (code) modifier of a Packet-Based Billing System.

FIG. 2 is an example block diagram of content instrumented with billing tracking code as performed by a content (code) modifier of a Packet-Based Billing System. Code, for example, an application 210, is sent to the code modifier 201 for analysis and instrumentation. The calling sequence of routines within application 210 is shown schematically (after undergoing a calling sequence analysis). According to the illustrated sequence, a "startup( )" routine 211 is called, followed by a network call 212, followed by an "end( )" routine 213 for application cleanup, followed by an exit call 214 to end application execution. The content modifier 201, looks up the network call in the configuration data repository 202, and determines and retrieves a corresponding network call 222 which contains code for implementing transmission-based billing and tracking. The corresponding network call 222 is implemented to invoke the original network call 212, thus it provides a "hook" to the original network call 212. The content modifier 201 also consults the configuration data repository 202 to determine configuration parameters for billing such as how frequently billing information is to be posted (for example, after a particular time or amount of data has been transmitted) and the network address of the proxy server to which the billing data is to be posted. The content modifier 201 then instruments the application with the retrieved network call 222 and code for posting billing data, as indicated by the determined configuration parameters. A schematic of an example modified application 220 is shown with a calling sequence after instrumentation has been performed. In the modified application 220, the "startup( )" routine 211 is called, now followed by the instrumented network call 222, which is followed by the original network call 212, followed by the "end( )" routine 213. The content modifier also instruments code 223 to post billing data to the proxy/billing server according to the determined configuration parameters. This posting code 223 is shown in the sequence between the "end( )" routine 213 and the exit call 214. Having code that posts billing data at the end of the application, even if billing data is posted earlier, attempts to retry posting any previously failed postings. In one embodiment, if the final posting call 223 fails, the billing data is simply lost and ignored. Other embodiments may choose to more permanently store the billing data and retry posting when the application is executed again. The retry expiration indicator can be used to prevent redundant billing events. Specifically, the client device determines, based on the timestamp, whether a retry period has expired, or whether the posting code should attempt to re-post the same billing data. One skilled in the art will recognize that many such variations are possible. In addition to the instrumented billing tracking code, in some embodiments, the content modifier 201 adds a security key 230 to the modified application in order to insure that billing data for the application, once downloaded cannot be misappropriated by sending fake billing data.

In other embodiments, as described in detail in U.S. Provisional Application No. 60/271,661, filed on Feb. 26, 2001, which is herein incorporated by reference in entirety, the billing tracking code is incorporated into content by other means, including intrusive and non-intrusive means. For example, a specification for packet-based billing tracking code can be provided to content providers which can modify their content to explicitly include such tracking. In a second example, an Application Programming Interface (an "API") can provide library of functions that can be invoked by content providers at appropriate points in the content to provide packet-based billing tracking and communication. In yet a third example, the network driver software of the target device, such as a wireless device, can be modified to include the packet-based billing tracking code (through specification or library mechanisms). In all of these other embodiments, either the content provider or the device driver manufacturer needs to be made aware of the billing tracking code and communication techniques; thus providing a more intrusive means of incorporating the billing support.

The PBBS components and functionality may be integrated into and dispersed over different components in a network environment, such as an application provisioning system. In that scenario, provisioning components then interact to determine and insert billing tracking code into the content, receive data from the billing tracking code, and process the tracked data in conjunction with indicated billing policies to generate billing records. More specifically, when an application is requested by a subscriber, the application is provisioned by the application provisioning system for the requesting device and is downloaded to the requesting device, with the appropriate billing code instrumented into the application. Provisioning, as used herein, is the customizing and distributing of content for a particular use, for example, for use on a particular kind of subscriber device by a particular customer. An example application provisioning system, referred to as the Mobile Application System (MAS), can be used with the PBBS discussed herein. Co-pending U.S. patent application Ser. No. 09/997,402, filed on Nov. 28, 2001, and entitled "Method and System for Maintaining and Distributing Wireless Applications," which is herein incorporated by reference in its entirety, describes such a system in detail, including techniques for instrumenting code into applications, customizing such applications, and distributed them to, especially, wireless devices. The MAS is a collection of interoperating server components that work individually and together in a secure fashion to provide applications, resources, and other content to mobile and wired subscriber devices.

Figure 3:
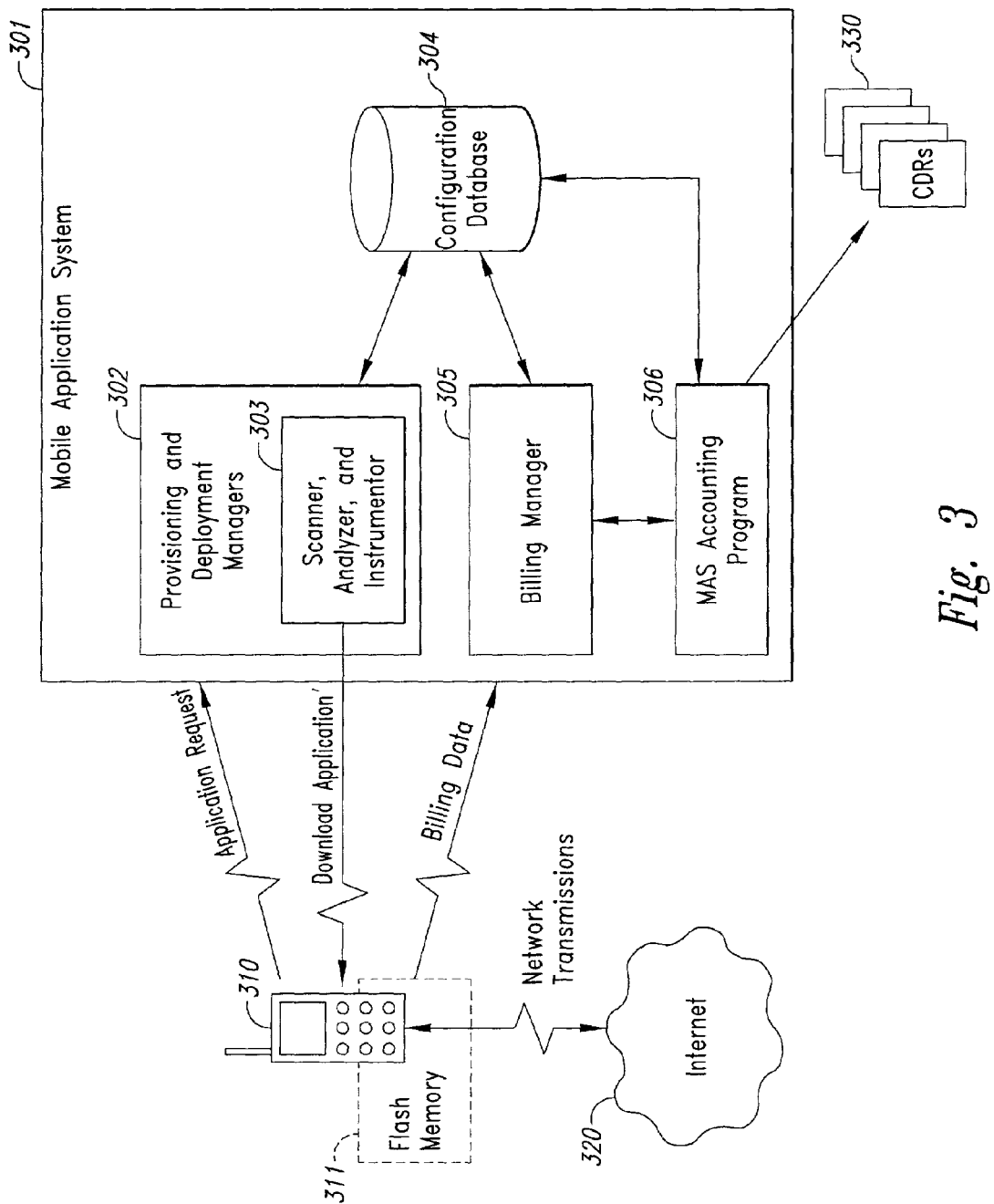
FIG. 3 is a block diagram of an example transmission-based billing system implemented within an example Mobile Application System.

FIG. 3 is a block diagram of an example transmission-based billing system implemented within an example Mobile Application System environment. The Mobile Application System (MAS) shown is a provisioning system connected over a wireless connection to a wireless handset 310. The components of the MAS include, among other components, the Provisioning and Deployment Managers 302, which contain as part of their function, content scanner, analyzer, and instrumentor capabilities 303; a Billing Manager 305; a Configuration data repository 304; and an Accounting Program 306. The instrumentor capabilities 303 of the Provisioning and Deployment Managers 302 provide the code modifier functions of the PBBS. The Billing Manager 305 can incorporate the role of a proxy server for collecting posted billing data. The wireless handset 310 includes typically flash memory 311, or other type of local, semi-permanent storage for holding billing data as it is collected. The wireless handset 310 is also connected over a wireless connection to a public network, such as Internet 320. For the purposes of ease in description is assumed that the handset 310 is capable of addressing servers on the public network 320 directly and separately from posting billing data to the MAS Billing Manager 305; however, this assumption is not necessary to accomplish the techniques described herein. In particular, if a client device is unable to directly address multiple servers, then a proxy server can be provided that implements store and forward capabilities for all received network packets. In this scenario, the proxy server receives a packet and determines its intended destination (as well as receiving the billing data); retrieves the billing data from the packet, and forwards the original packet data to its intended destination.

Although the techniques of the PBBS are generally applicable to any type of client wireless device, one skilled in the art will recognize that terms such as subscriber device, client device, phone, handheld, etc., are used interchangeably to indicate any type of subscriber device that is capable of operating with the PBBS. Also, terms may have alternate spellings which may or may not be explicitly mentioned. For example, byte-code may be also indicated as "bytecode" or "Bytecode," and one skilled in the art will recognize that all such variations of terms are intended to be included. In addition, example embodiments described herein provide applications, tools, data structures and other support to implement a transmission-based billing system over one or more networks. One skilled in the art will recognize that other embodiments of the methods and systems of the present invention may be used for many other purposes, including instrumenting transmission-based billing support into software and other content over non-wireless networks, such as the Internet, to non-wireless subscriber devices, such as a personal computer, a docked wireless handset, telephones with Internet connectivity, or customer kiosks, for example, within airports or shopping malls. In addition, although this description primarily refers to content in the form of applications, services, and resources, one skilled in the art will recognize that the content may contain text, graphics, audio, and video. Also, in the following description, numerous specific details are set forth, such as data formats and code flows, etc., in order to provide a thorough understanding of the techniques of the methods and systems of the present invention. One skilled in the art will recognize, however, that the present invention also can be practiced without some of the specific details described herein, or with other specific details, such as changes with respect to the ordering of the code flow.

In addition, the techniques of the PBBS can be extended to operate with streaming content. Specifically, when streaming content (such as text, audio, video, graphics, etc.) is requested by a client device, the request indicates an amount of content to download. The content modifier, instead of inserting billing and tracking code into the content, generates billing events directly and sends them to a proxy/billing server.

Also, one skilled in the art will recognize that the techniques of the present invention can be used for other uses in which determining and tracking the amount of data sent and received is valuable, other than for generating billing data. For example, an additional use for the techniques of the present invention relates to the routing of network packets and requests. Specifically, the same techniques for tracking billing data based upon the amount of data sent and received between content and the network can be used by a proxy server (or other component or system) to decide how and where to route network packets based upon a routing policy. The "billing" data posted includes information that identifies the user, the application and the amount of data being transmitted, which can be used by a routing system to route traffic. For example, an application server may wish to distribute network traffic in a particular manner or reserve particular servers for application/user combinations that are heavily trafficked; thus, providing a type of load balancing.

Figure 4:
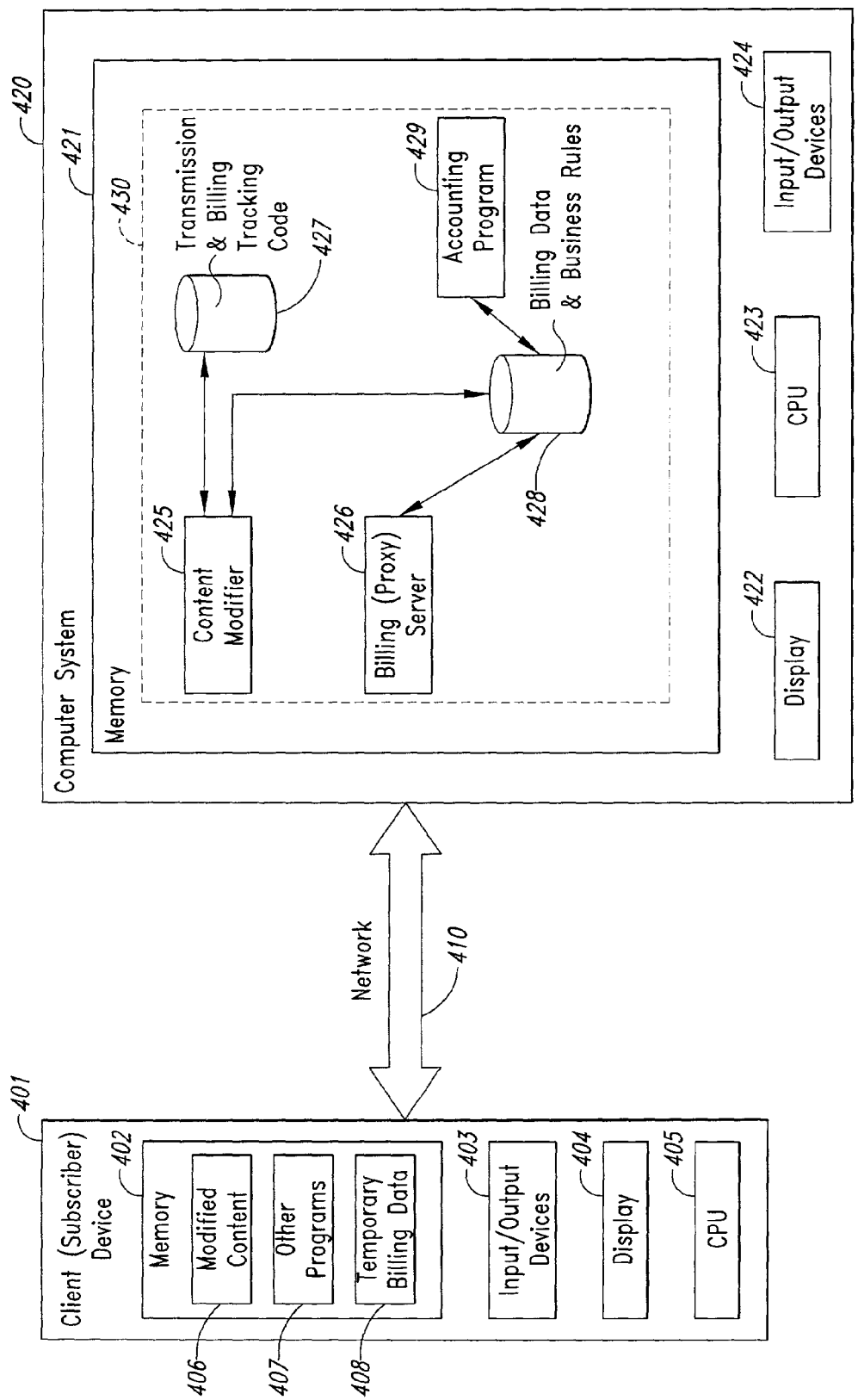
FIG. 4 is an example block diagram of a general-purpose computer system and a client device for practicing embodiments of the transmission-based billing system.

FIG. 4 is an example block diagram of a general-purpose computer system and a client device for practicing embodiments of the transmission-based billing system. The computer environment of FIG. 4 comprises a client (subscriber) device 401 and a general purpose computer system 420, which communicate via a network 410. Each block may represent one or more such blocks as appropriate to a specific embodiment, or be combined with other blocks, and each may reside in separate physical locations.

The client device 401 comprises a computer memory ("memory") 402, a display 404, Input/Output Devices 403, and a Central Processing Unit ("CPU") 405. Modified Content 406, for example an executable application, is shown residing in memory 402 with other downloaded applications 407 and a data repository for temporary storage of billing data 408. The Modified Content 406 preferably executes on CPU 405 and executes the inserted billing tracking code, as described in previous figures, to track transmission data and to communicate the billing data to a proxy/billing server across the network 410.

The general-purpose computer system 420 may comprise one or more server and/or client computing systems and may span distributed locations. In one embodiment, wherein the PBBS is integrated into an application provisioning system such as a MAS, the MAS is implemented using Java 2 Enterprise Edition (J2EE) and executes on a general-purpose computer system that provides a J2EE compliant application server. According this embodiment, the MAS is designed and coded using a J2EE multi-tier application architecture, which supports a web tier, business tier, and a database tier on the server side. Thus, general purpose computer system 420 represents one or more servers capable of running one or more components and/or data repositories of the MAS and the PBBS.

As shown, general purpose computer system 420 comprises a CPU 423, a memory 421, and optionally a display 422 and Input/Output Devices 424. The components of the PBBS 430 are shown residing in memory 421, and preferably execute on one or more CPUs 423. Other data repositories and other programs (not shown) also reside in memory 421, and preferably execute on one or more CPUs 423. In a typical embodiment, the PBBS 430 includes a Content Modifier 425, Data Repositories 427 and 428 for storing transmission and billing tracking code, billing data and business rules, Billing Server 426 (which is shown acting as the proxy and billing server), and Accounting Program 429. As described earlier, the PBBS may include other data repositories and components depending upon the needs of and integration with the carrier or other host systems. Other components, which are part of the application provisioning system, are also present in the memory 421, but not shown, such as the provisioning and deployment components and a local applications store. As mentioned, applications are provisioned and instrumented with the billing tracking code by the Content Modifier 425 before downloading to the client device 401.

One skilled in the art will recognize that the PBBS 430 may be implemented in a distributed environment that is comprised of multiple, even heterogeneous, computer systems and networks. For example, in one embodiment, the Content Modifier 425 and the Billing Server 426 are located in physically different computer systems. In another embodiment, various components of the PBBS 430 are hosted each on separate server machines and may be remotely located from the data repositories 427 and 428. In addition, under some scenarios, the Accounting Program 429 may be hosted within a carrier's infrastructure and be completely separated from the PBBS. Different configurations and locations of programs and data are contemplated for use with techniques of the present invention.

In an example embodiment, components of the PBBS 421 are implemented (as part of the MAS) using a J2EE multi-tier application platform, as described in detail in *Java™ 2 Platform, Enterprise Edition Specification, Version* 1.2, Sun Microsystems, 1999, herein incorporated by reference in its entirety. The Content Modifier 425 is typically part of the MAS Provisioning and Deployment Managers (as shown in FIG. 3). The Billing Manager 426 is a component of the MAS, enhanced to perform the various capabilities associated with transmission based billing. The data repositories 427 and 428 for storing the code to be instrumented, business rules, and billing data may be part of the Configuration Manager of the MAS (see Configuration Data Repository 304 of FIG. 3) or may be implemented as separate data repositories, depending upon security needs, the location of the Accounting Program 429, etc. FIGS. 5-13 describe various example embodiments of the specific routines implemented by each of these components to achieve the functionality described with reference to FIGS. 1-3. In example embodiments, these components may execute concurrently and asynchronously; thus, the components may communicate using well-known message passing techniques. One skilled in the art will recognize that equivalent synchronous embodiments are also supportable by a PBBS implementation. Also, one skilled in the art will recognize that other steps could be implemented for each routine, and in different orders, and in different routines, yet still achieve the functions of the PBBS.

As described with respect to FIG. 1, client (subscriber) devices can request an application from an application provisioning system, such as a Mobile Application System.

Figure 5:
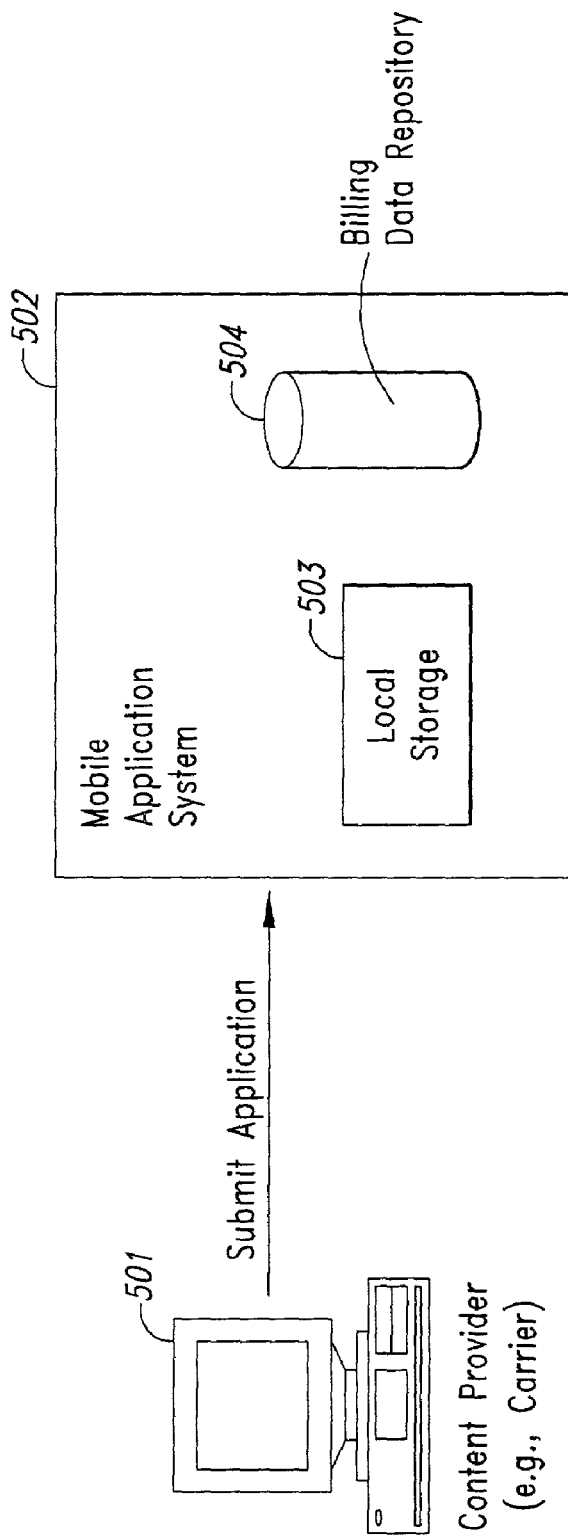
FIG. 5 is a block diagram of an example procedure for submitting an application to a Mobile Application System for use with transmission-based billing.

Using the MAS, the application may be pre-provisioned for the device and subscriber and stored locally within the MAS (termed "walled garden provisioning") or may be provisioned on the fly when an application is requested, for example, by browsing a site over the Internet (termed "open provisioning"). FIG. 5 is a block diagram of an example procedure for submitting an application to a Mobile Application System for use with transmission-based billing. In FIG. 5, a content provider 501, such as a third party application provider or a carrier, submits an application to the provisioning system, here shown as MAS 502. The MAS 502 stores the application (either as raw data or pre-provisioned) in local storage 503. The content provider 501 also provides billing related business rules, which are stored appropriately by the MAS 502 in Billing Data Repository 504. These rules indicate billing related information such as the frequency or interval for posting the billing data, the address of the proxy server to send the billing data to, the size of a logical packet, and billing charge information associated with the logical packet size. One skilled in the art will recognize that other billing related business rules that are application-or user-specific may also be stored as needed.

Figure 6:
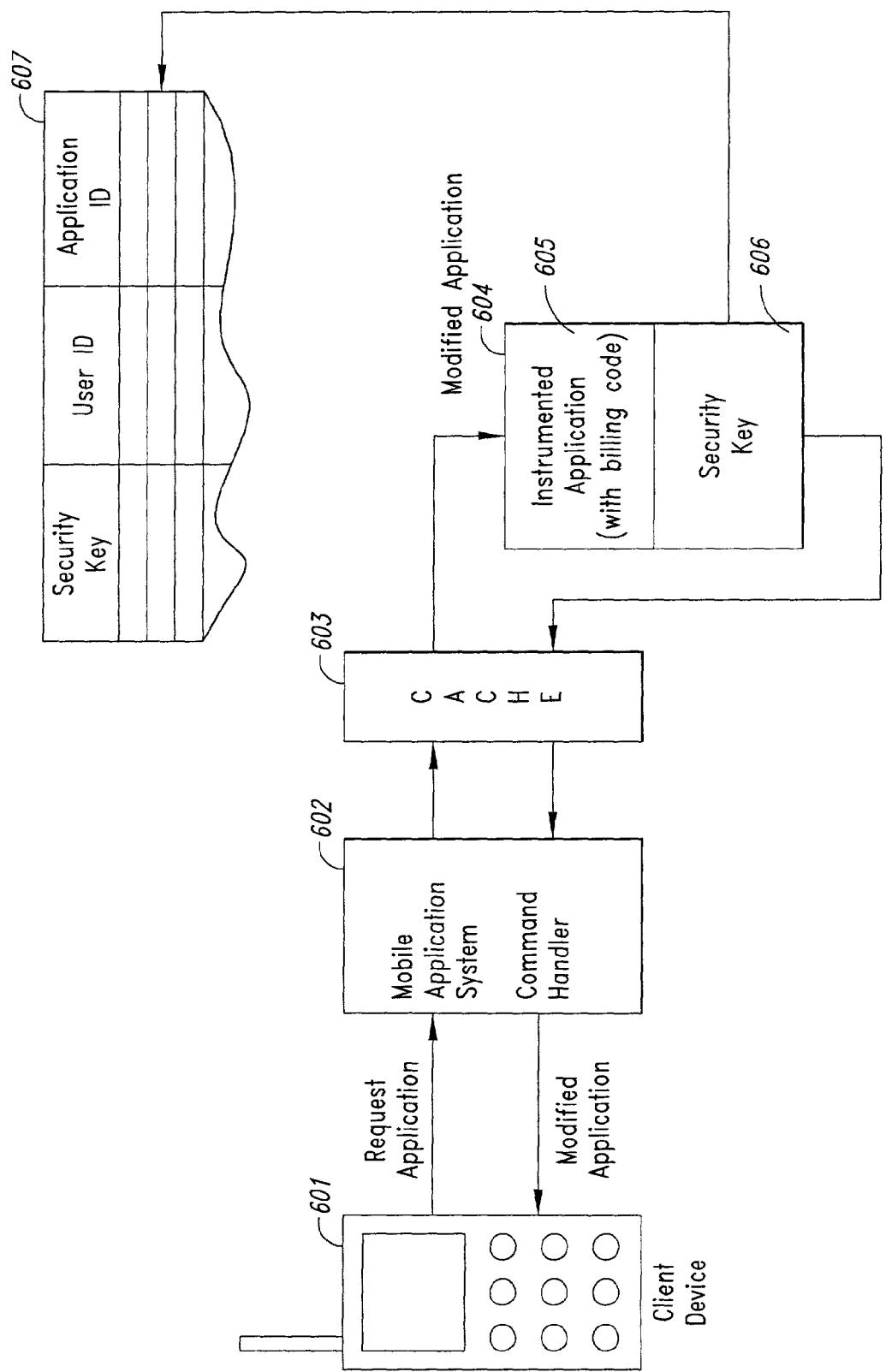
FIG. 6 is an example block diagram that illustrates an overall process for transparently delivering an application that supports transmission-based billing to a client device using a Mobile Application System.

FIG. 6 is an example block diagram that illustrates an overall process for transparently delivering an application that supports transmission-based billing to a client device using a Mobile Application System. The client device 601 requests an application from the MAS 602 using the command handler 602, which processes requests for the MAS. The command handler 602, is responsible for distributing the application request to the appropriate component of the MAS, such as the MAS Provisioning and Deployment Managers (not shown). These components, which also contain the Content Modifier functionality, determine whether an application that corresponds to the requested application already exists in the cache 603, or whether an application needs to be provisioned for deployment. As part of the provisioning process, billing tracking code is instrumented into application 605 and a security key 606 is added, to generate modified application 604. Even if a provisioned application with instrumented billing tracking code is available in the cache 603, it may be necessary (depending upon the technique used) to generate a security key. The security key 606 is preferably generated and stored in a secure data repository 607 along with an associated subscriber identifier and application identifier. Any mechanism for generating a security key that is uniquely associated with a subscriber and an application may be incorporated and used with the techniques of the present invention. One mechanism is to generate a n-bit random number and combine it in some way with a unique application identifier and a unique subscriber identifier. This mechanism allows a single security key to be reused for more than one application/subscriber combination, because the key is uniquely tied to each application/subscriber combination. Thus, modified content (which includes the billing tracking code and security key) can be cached, hence allowing faster downloads of content. Alternatively, a unique security key can be associated with each application/subscriber version of content. The purpose of the security key is to generate a number that can be later recognized as uniquely belonging to a particular subscriber and application when billing data is posted to the proxy/billing server for collection and processing. The modified application 604 is optionally stored in the cache 603 and returned through the command handler 602 to the requesting client device 601. It may be desirable to store the modified application 604 in the cache 603 for a short period of time in case the request failed to download properly and the client device 601 retries the request for the same application. Note, however, that in one embodiment, the security key that is added to the application is associated with a particular subscriber. In that scenario, storing the modified application 604 with a security key in the cache 603 doesn't make sense for deploying to a different application/subscriber combination.

Figure 7:
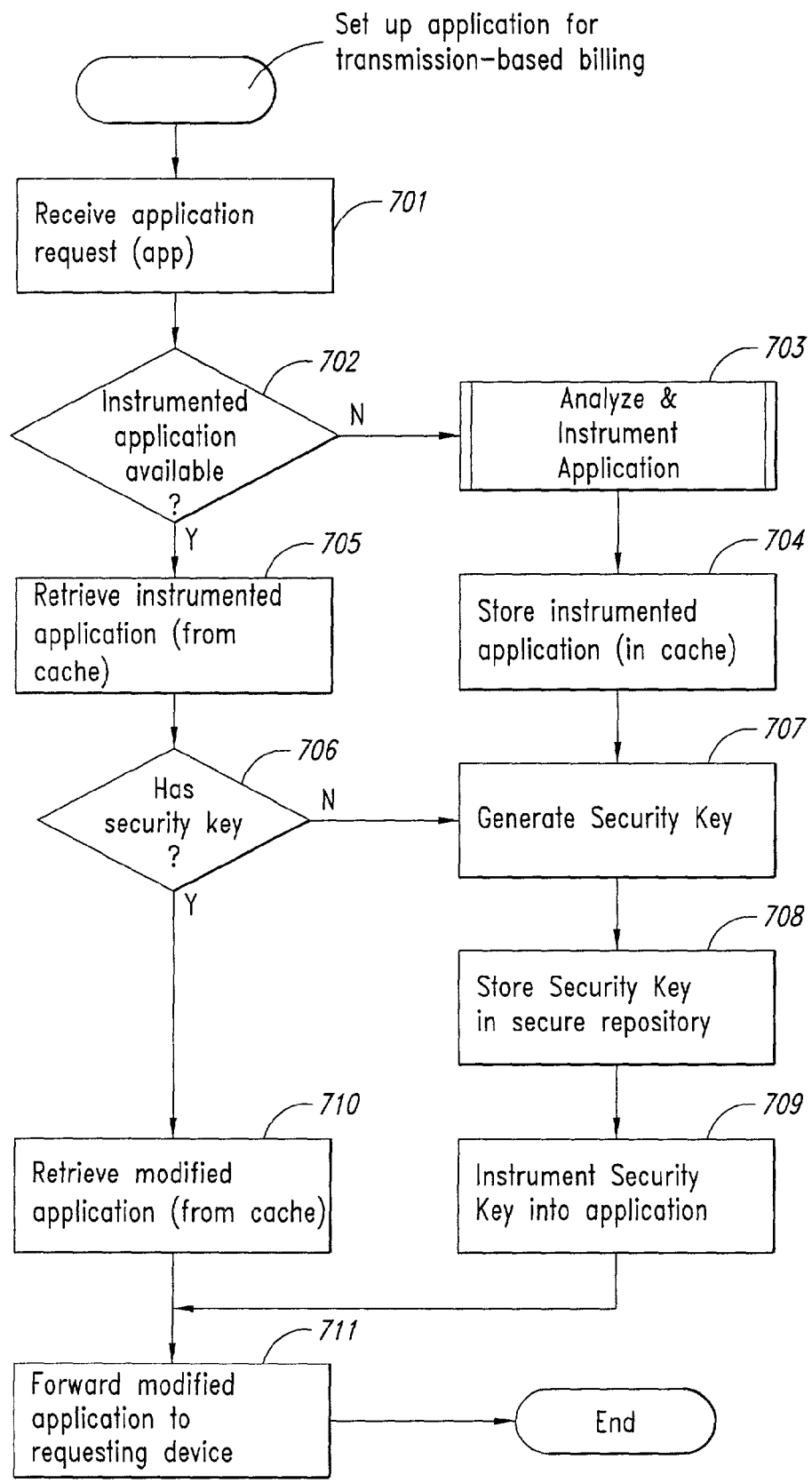
FIG. 7 is an example flow diagram of a routine for modifying an application to support transmission-based billing.

FIG. 7 is an example flow diagram of a routine for modifying an application to support transmission-based billing. This routine is typically executed as part of the provisioning and deployment process (see Content Modifier 201 in FIG. 2). In summary, the routine determines or generates a version of the designated application with instrumented billing tracking code, determines or generates an appropriate security key which is inserted into the application, and returns the modified application to the requestor. Specifically, in step 701, the routine receives an application request with a designated application as a parameter. In step 702, the routine determines whether an instrumented application is already available (for example, is stored in cache 603 in FIG. 6), and, if so, continues in step 705, else continues in step 703. In step 703, the routine analyzes the code flow of the application and instruments the billing tracking code into the application. This process is described further below with respect to FIG. 8. In step 704, the routine stores the instrumented application, for example, in an application cache, and continues in step 707. In step 705, after determining that an instrumented application is already available, the routine retrieves the instrumented application from local storage, e.g., the cache, and continues in step 706. In step 706, the routine determines whether the retrieved application already has a security key attached or associated with it, and, if so, continues in step 710 to retrieve the security key (or modified application with the security key), else continues in step 707. It may be desirable to keep an attached security key with the instrumented application for a limited period of time to limit potential misappropriations. In step 707, the routine generates a new security key for the application. Any appropriate security mechanism may be utilized, including the one described with respect to FIG. 6. In step 708, the routine stores the newly generated security key in a secure data repository. In step 709, the routine instruments the new security key into the application. In step 711, the routine forwards the modified application which now includes the instrumented billing tracking code and the security key to the requestor, and ends processing.

Figure 8:
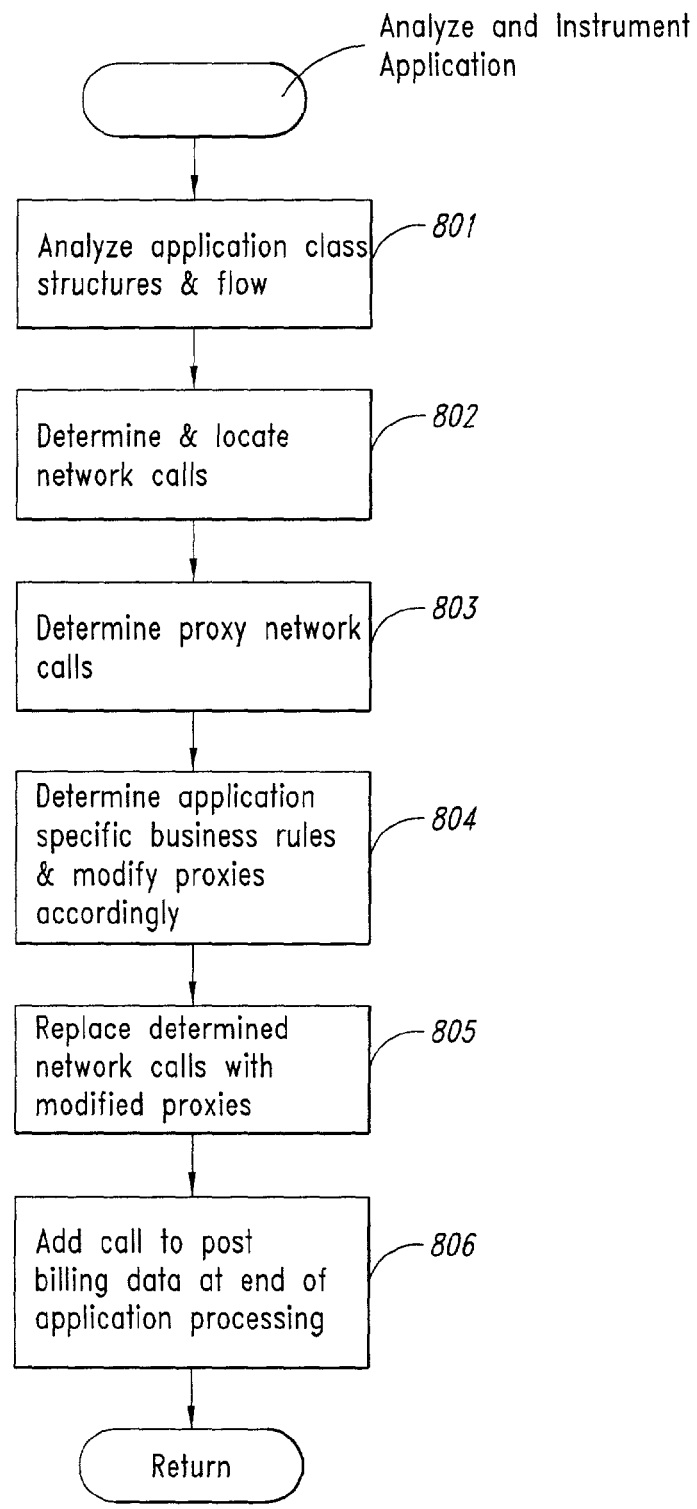
FIG. 8 is an example flow diagram of a routine for analyzing and instrumenting an application with support for transmission-based billing.

FIG. 8 is an example flow diagram of a routine for analyzing and instrumenting an application with support for transmission-based billing. This routine transforms an application to a modified application that contains support for transmission-based billing as illustrated in FIG. 2. In step 801, the routine scans and analyzes the structure and calling sequence flow of the application, preferably at the byte-code (sometimes termed "binary application") level, to understand the data structures (package, class, method, and field definitions) and the calling sequences. As part of this deconstruction/decoding process, the routine detects all of the APIs present in the application and identifies any network calls. As a result of this analysis, in step 802, the routine identifies what code calls the network calls, hence where the calls are located within the application. When the applications are coded in Java, then this analysis can be performed at a byte-code (or binary) level of the program, with no need to insert analysis generating code at the source level. (The byte-code level refers to an "intermediate" level of binary code, which is interpreted by an "engine," "byte-code" interpreter, or "virtual machine," etc. in order to execute.) One skilled in the art will recognize that, other embodiments can be implemented for other languages and content, providing the data structures and calling sequence can be detected and analyzed. Java and .NET applications, in particular, are inherently well suited to such a process because they are instruction driven —different byte codes are used to indicate different language elements. Other intermediate code languages can be similarly analyzed. In step 803, the routine determines proxy network calls that correspond to the located network calls within the application. These proxy calls are typically determined from a configuration data repository which associates various network calls with particular devices and protocols. Appendix A includes example pseudo-code for mapping located network calls to proxy network calls. In step 804, the routine determines specific business rules that apply to this application as specified, for example, by a carrier. As described earlier, these rules may define the interval/frequency for billing data to be posted to the proxy/billing server, the logical size of a packet to be used for charging, and the charge associated with a packet. An extensive set of rules may be specified on an application or on a per-user basis. One skilled in the art will recognize that other business rules can be specified as appropriate and can be changed over time. For example, in some systems, the application programmer may be allowed to provide default charge information which can then be modified by a standard multiplier by the carrier, hence the PBBS. In step 805, the routine replaces the identified network calls in the application with the proxy network calls, as illustrated in FIG. 2. In step 806, the routine adds a final proxy network call to post billing data at the end of application processing, as illustrated in FIG. 2. This call is typically added even if the prior proxy network call posted billing data to the proxy/billing server in case a prior call failed. In a situation where the prior proxy network calls collect the data locally on the client device, this final call to post data communicates the accumulated set of billing data.

Figure 9:
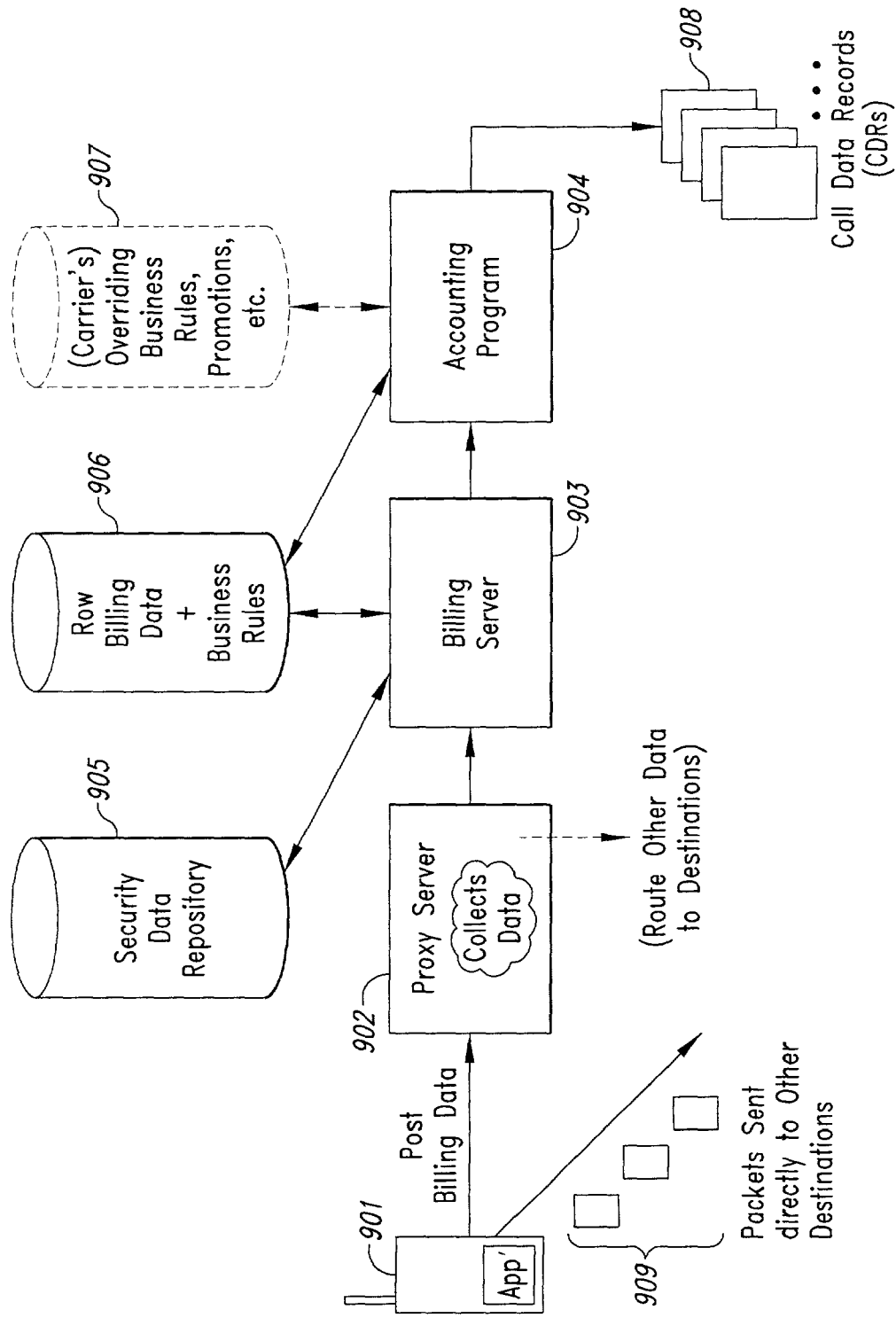
FIG. 9 is an example block diagram that illustrates an overall process for communicating billing data based upon network transmission data on a per application basis.

As described with respect to FIG. 1, when modified content is executed (processed) on a client device, the billing tracking code is activated, collects the data, and automatically posts it to a proxy/billing server associated with the PBBS. FIG. 9 is an example block diagram that illustrates an overall process for communicating billing data based upon network transmission data on a per application basis. Although for the purposes of example, the components are presumed to be part of an application provisioning system, one skilled in the art will recognize that, as described earlier, they can be integrated into any content delivery system capable of performing the functions of the PBBS. In FIG. 9, a client device 901 posts billing data (through network packets) to a proxy server 902, as a result of the posting code previously instrumented into the application (see FIGS. 2 and 8). Two different types of proxy servers may be implemented depending upon the capabilities of the devices. In particular, some devices can send network packets directly to more than one server. In that case, packets 909 destined for other servers can be sent directly to them, while billing data can be sent directly to the proxy server 902. (Such a setup is sometimes referred to as a compute and log approach.) Other devices are able to send network packets to only one server. In this scenario, the proxy server 902 acts as a store and forward proxy server and distributes network packets to their intended destinations, processing only the packets with the posted billing data. The proxy server 902, if a separate server, collects the posted data and forwards it as appropriate to a billing server 903. In some embodiments, the proxy server and billing server are combined. In some situations, however, for example due to security concerns, it may be desirable to separate the proxy and billing servers. As another example, the billing server may already exist and have particular data collection protocol to which the proxy server interfaces. Once the collected billing data is received, the billing server 903 determines whether the security key sent with the billing data is legitimate by comparing it with the expected security key in security data repository 905 for that particular application and that user. If the security key is legitimate, the billing server 903 stores the raw billing data in a data repository 906. The billing server 903 may optionally post-process the billing data according to business rules stored, for example, in repository 906. One skilled in the art will recognize that the data repositories are separated as shown for mere illustration, and that other combinations can be used, such as a single data repository. In addition, the proxy server 902 may store the raw billing data directly, to be processed asynchronously by the billing server 903. The accounting program 904 retrieves the billing data (raw or post-processed) from the data repository 906 and optionally uses overriding business rules, for example, as stored in data repository 907, to further process the billing data and to generate call (customer) data records 908. Overriding business rules may include, for example, specific application or subscriber overrides, promotions, etc.

Figure 10:
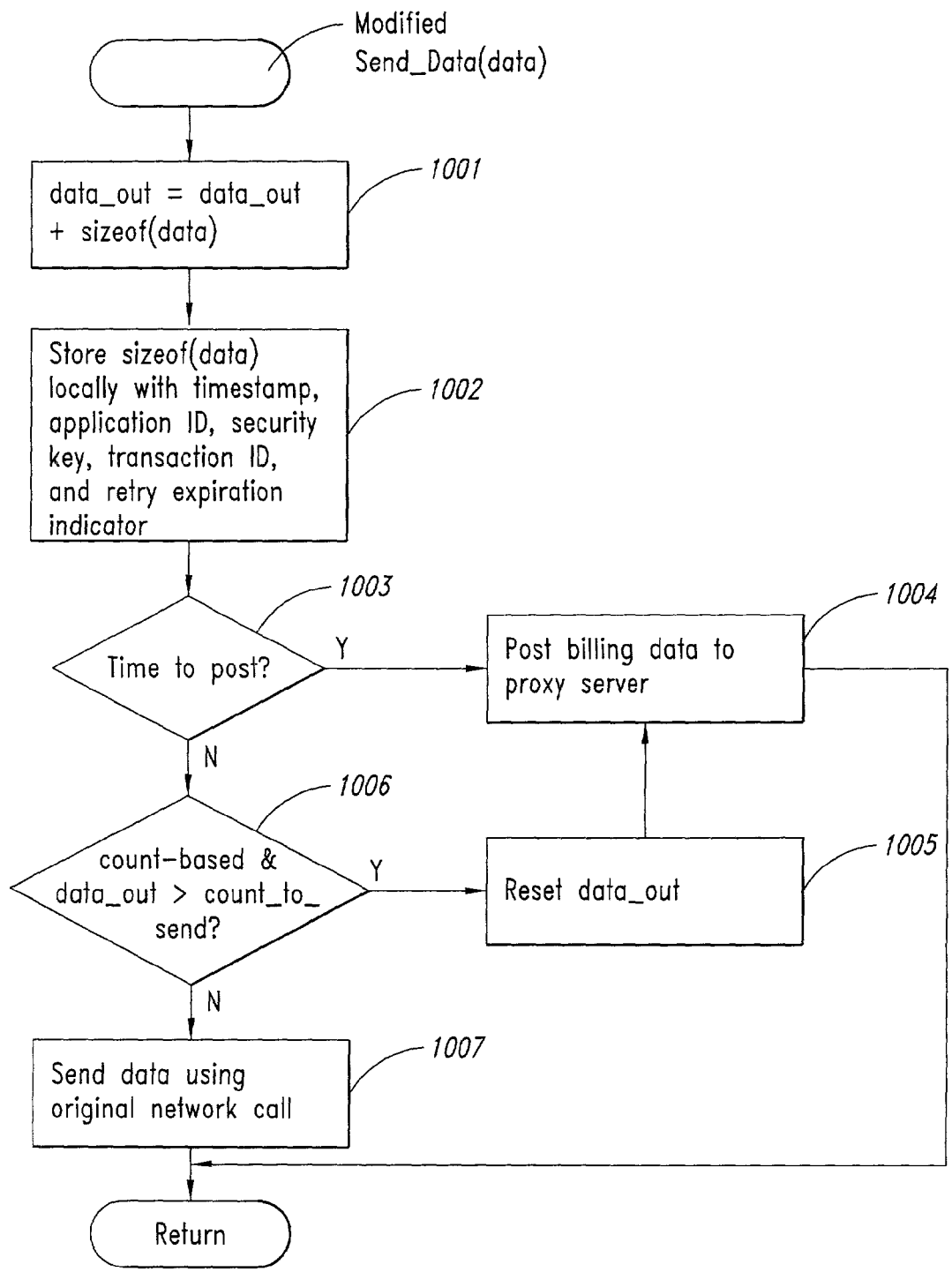
FIG. 10 is an example flow diagram of a client routine for sending data to a network that has been modified to collect and transmit billing data.

FIG. 10 is an example flow diagram of a client routine for sending data to a network that has been modified to collect and transmit billing data. This routine illustrates example proxy network code that replaces some type of "send_data" network call. An example pseudo-code implementation of proxy network code that sends data across a network is included as Appendix B. The routine tracks and accumulates the amount of data being sent, and, when the accumulated amount corresponds to the business rule incorporated into the routine for the frequency/interval for posting the billing data, then the billing data is posted. Specifically, in step 1001, the routine determines the amount of data that is to be sent in the current packet and accumulates it (e.g., in a variable "data_out"). In step 1002, the routine stores the amount of data in the current packet along with a timestamp, application identifier, and security key in local storage. In step 1003, the routine determines whether it is time to post the data (e.g., whether the coded interval of time/frequency has passed for posting the data), and, if so, continues in step 1004 to post the billing data to the proxy server, else continues in step 1006. In step 1006, the routine determines whether the business rule for posting data based is count based (based upon the amount of data) and, if so, whether the count is greater than the indicated rule for posting data. If so, then the routine continues in step 1005, else continues in step 1007. In step 1005, the routine resets the data amount counter and continues in step 1004 to post the billing data to the proxy server. In step 1007, the routine sends the data using the original network call coded into the application, and then returns.

Figure 11:
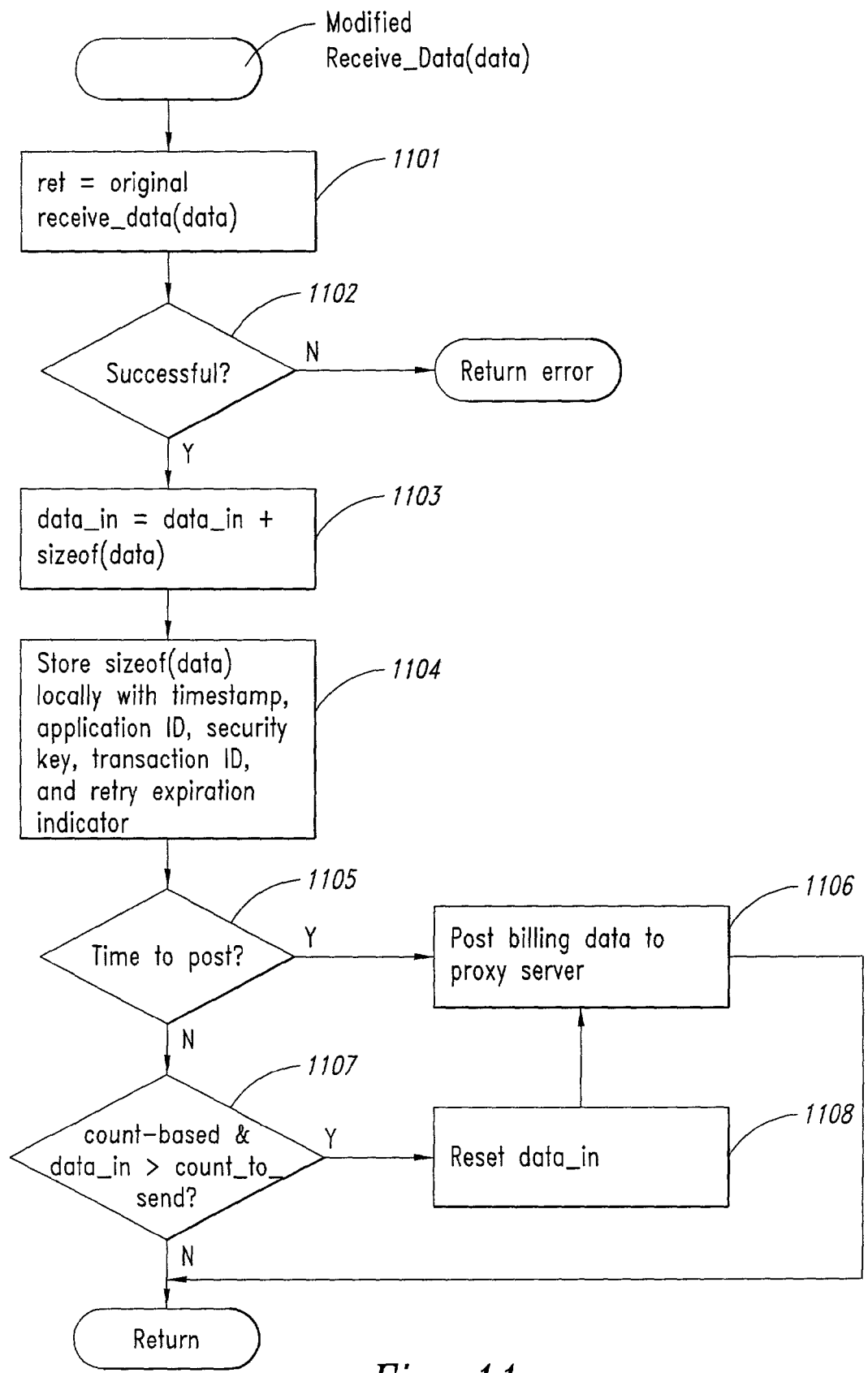
FIG. 11 is an example flow diagram of a client routine for receiving data from a network that has been modified to collect and transmit billing data.

FIG. 11 is an example flow diagram of a client routine for receiving data from a network that has been modified to collect and transmit billing data. This routine illustrates example proxy network code that replaces some type of "receive_data" network call. An example pseudo-code implementation of proxy network code that receives data across a network is included as Appendix C. The routine intercepts the original "receive_data" network call, tracks and accumulates the amount of data being received, and, when the accumulated amount corresponds to the business rule incorporated into the routine for the frequency/interval for posting the billing data, then the billing data is posted. Specifically, in step 1101, the routine receives the data using the original network call and intercepts the return. Then, in step 1102, the return determines whether the original network call was successful, and, if so, continues in step 1103, else returns an error.

In step 1103, the routine determines the amount of data that was received in the packet and accumulates it (e.g., in a variable "data_in"). In step 1104, the routine stores the amount of data in the received packet along with a timestamp, application identifier, and security key in local storage. In step 1105, the routine determines whether it is time to post the data (e.g., whether the coded interval of time/frequency has passed for posting the data), and, if so, continues in step 1106 to post the billing data to the proxy server, else continues in step 1107. In step 1107, the routine determines whether the business rule for posting data based is count based (based upon the amount of data) and, if so, whether the count is greater than the indicated rule for posting data. If so, then the routine continues in step 1108, else returns. In step 1108, the routine resets the data amount counter and continues in step 1106 to post the billing data to the proxy server, and then returns.

Figure 12:
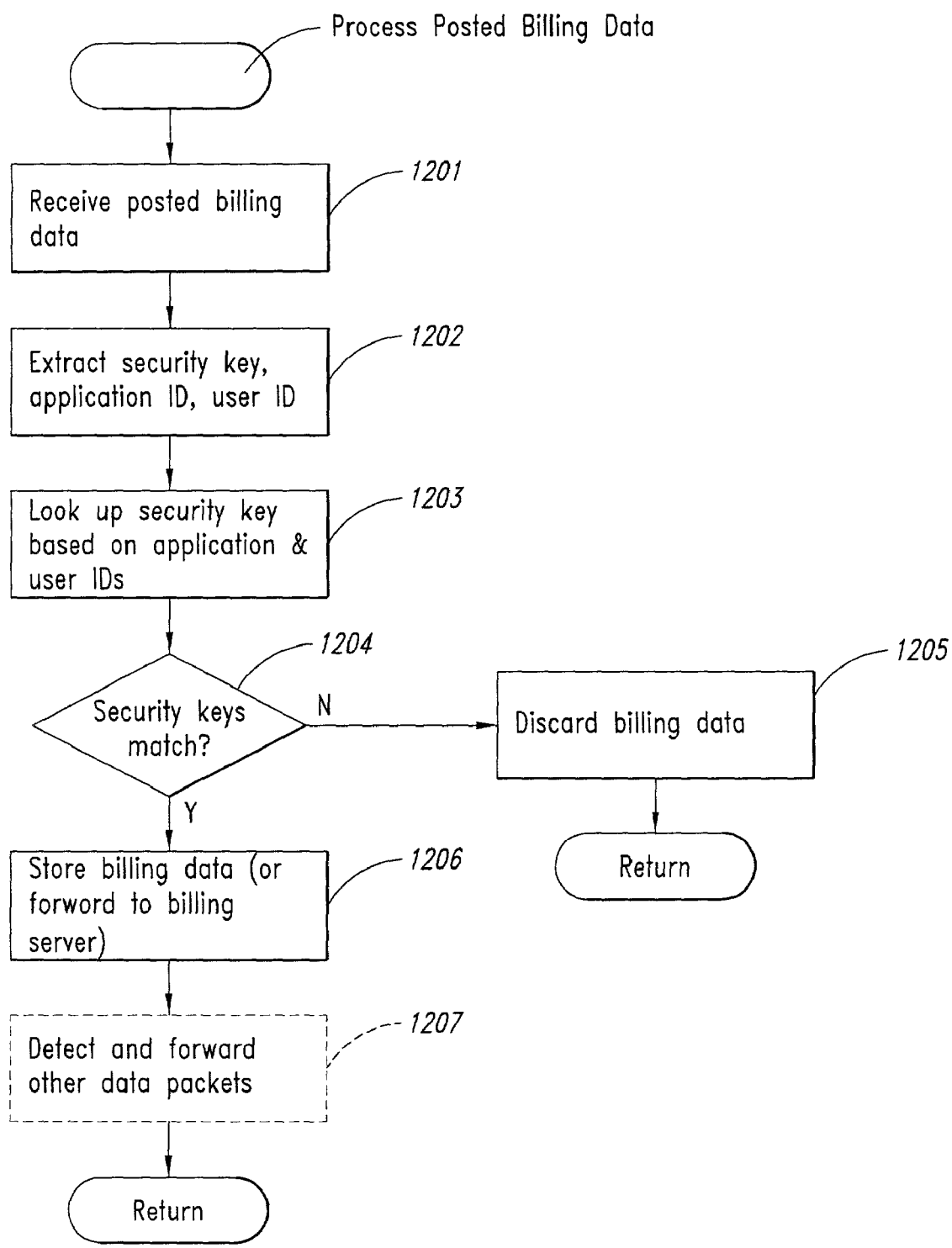
FIG. 12 is an example flow diagram of a server routine for processing posted transmission-based billing data.

FIG. 12 is an example flow diagram of a server routine for processing posted transmission-based billing data. This routine may be performed, for example, by a billing server, such as billing server 903 in FIG. 9 or by a proxy server, such as proxy server 902 in FIG. 9. One skilled in the art will recognize that the steps included here are merely illustrative, and that different steps may be substituted for or combined with these steps, depending upon the arrangement and integration of the functions of the PBBS in a surrounding environment. In step 1201, the routine receives the posted billing data from a client device. In step 1202, the routine extracts the security key, application identifier, and user identifier from the billing data. The routine, in step 1203, then compares this information with the application identifier and user identifier associated with that security key in a security key data repository table. In step 1204, if the security key information matches, the routine continues in step 1206, else the billing data is discarded in step 1205, and the routine returns. In step 1206, the routine stores the billing data (or forwards the billing data to a billing server). In embodiments in which devices are restricted to communication with one server system, then in step 1207, the routine detects and forwards data packets designated for other servers, and then returns.

Figure 13:
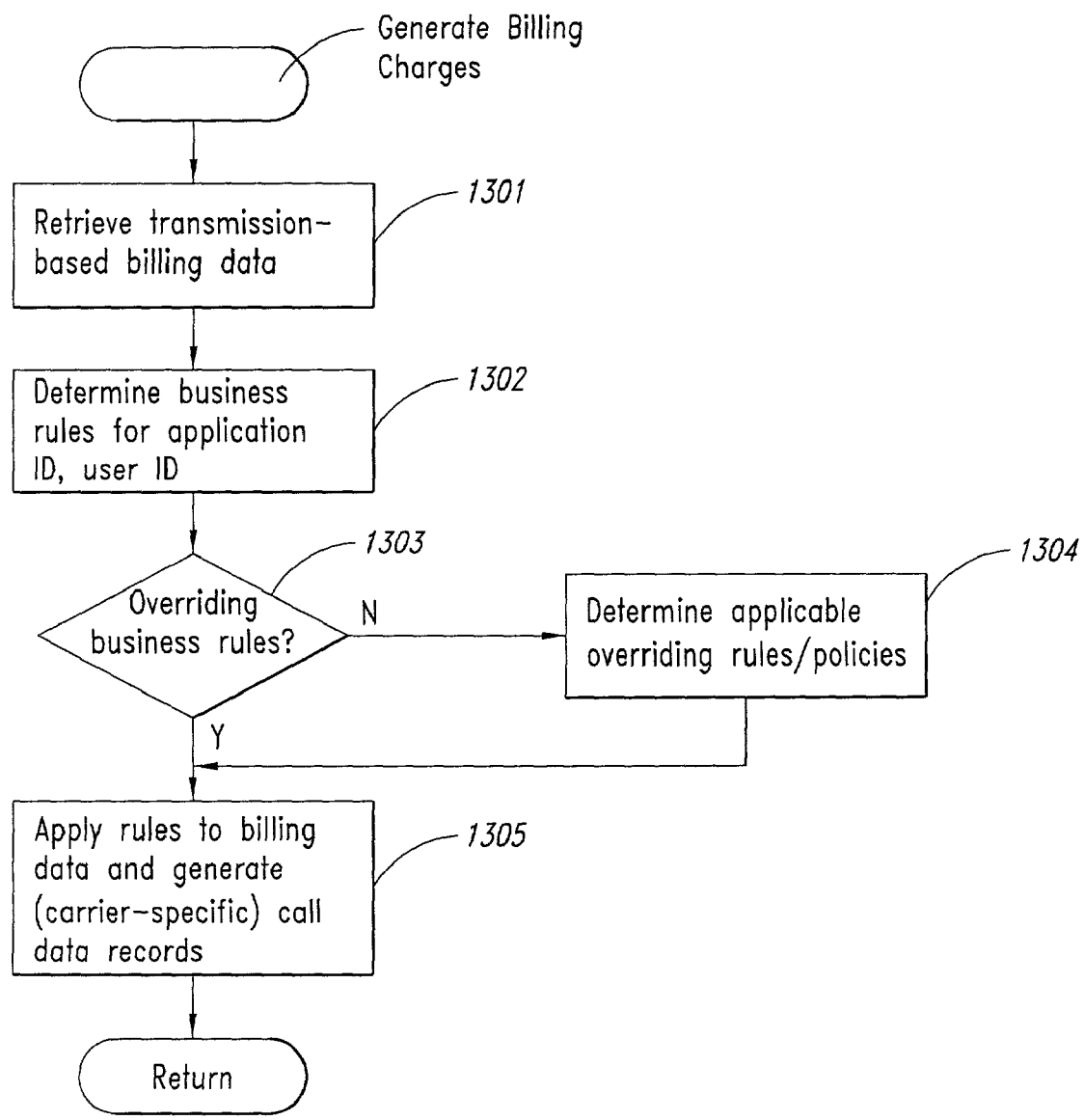
FIG. 13 is an example flow diagram of steps for generating billing charges based upon transmission-based billing data.

FIG. 13 is an example flow diagram of steps for generating billing charges based upon transmission-based billing data. This routine may be performed, for example, by an accounting program, such as Accounting Program 904 in FIG. 9. The steps shown here are generally applicable to processing billing records; however, depending upon the specifics of the carrier or other content provider that is determining the billing rates, applicability and the format of the customer (call) data records, various additional or different steps may be included. In step 1301, the routine retrieves the transmission-based billing data. In step 1302, the routine determines the applicable business rules for the indicated application identifier and user identifier. In step 1303, the routine determines whether there are any overriding policies/business rules, for example, promotions, discounts, etc., and, if so, continues in step 1304 to determine the overriding rules, else continues in step 1305. In step 1305, the routine applies any determined business rules and generates call data records. The format of these records is highly dependent upon any billing system that the transmission-based billing data is being integrated into, for example, an already existing billing system within a wireless carrier infrastructure.

From the foregoing it will be appreciated that, although specific embodiments of the invention have been described herein for purposes of illustration, various modifications may be made without deviating from the spirit and scope of the invention. For example, one skilled in the art will recognize that the methods and systems discussed herein are applicable to content provisioning systems and transmission-based billing system across any network, wired or wireless, or even a plurality of such networks. One skilled in the art will also recognize that the methods and systems discussed herein are applicable to differing protocols, communication media (optical, wireless, cable, etc.) and subscriber devices (such as wireless handsets, electronic organizers, personal digital assistants, portable email machines, game machines, pagers, navigation devices such as GPS receivers, etc.). Also, all of the above U.S. patents, U.S. patent application publications, U.S. patent applications, foreign patents, foreign patent applications and non-patent publications referred to in this specification and/or listed in the Application Data Sheet, including but not limited to U.S. patent application Ser. No. 09/997,402, filed on Nov. 28, 2001, and entitled "Method and System for Maintaining and Distributing Wireless Applications;" and U.S. Provisional Application No. 60/271,661, filed on Feb. 26, 2001, and entitled "Method and System for Packet Level Billing in Wireless Application Environments," are incorporated herein by reference, in their entirety. Aspects of the invention can be modified, if necessary, to employ methods, systems and concepts of these various patents, applications and publications to provide yet further embodiments of the invention. In addition, those skilled in the art will understand how to make changes and modifications to the methods and systems described to meet their specific requirements or conditions.

The invention claimed is:

1. A method in a wireless device for automatically transmitting packet-based billing data, comprising: when a packet of data is received from a network, logging, in the wireless device, the amount of data received; when a packet of data is to be sent over the network, logging in the wireless device, the amount of data to be sent; and transmitting the logged amount of data from the wireless device to a server system to be accumulated, thereby enabling the server system to bill a subscriber based upon the accumulated data.

2. The method of claim 1 wherein the logging the amount of data is performed by code that is transparently loaded onto the wireless device.

3. The method of claim 1 wherein the logging the amount of data and transmitting the logged data are performed by code that resides in a code library.

4. The method of claim 1 wherein the logging the amount of data and transmitting the logged data are performed by code that resides in the network driver software of the wireless device.

5. The method of claim 1 wherein the logging the amount of data and transmitting the logged data are performed by code that is written to a specification for transmission-based billing.

6. The method of claim 1 wherein the logging the amount of data and transmitting the logged data are performed by code that is instrumented as billing code into content prior to delivery of the content to the wireless device and execution of the content on the wireless device.

* * * * *